Aug. 25, 1959     T. I. PRZYSIECKI     2,901,069
CLUTCH FOR CODING MACHINE

Filed Dec. 15, 1944

INVENTOR
THEODORE I. PRZYSIECKI

BY

ATTORNEY

United States Patent Office 2,901,069
Patented Aug. 25, 1959

2,901,069

CLUTCH FOR CODING MACHINE

Theodore I. Przysiecki, Elmwood Park, Ill., assignor to the United States of America as represented by the Secretary of the Navy Application December 15, 1944, Serial No. 568,365

6 Claims. (Cl. 192—33)

This invention relates to a driving shaft and means for effecting rotation thereof, one revolution at a time, and is particularly adapted for use in electric coding machines, though it may be utilized wherever a drive of this type is required.

It is an object of this invention to provide a shaft to transmit power from a continuously operating prime mover with means for connecting the shaft to the prime mover at the will of the operator to effect rotation thereof one revolution each cycle of operation. Other objects will become apparent when the following description is read in connection with the accompanying drawings, in which.

Figure 1:
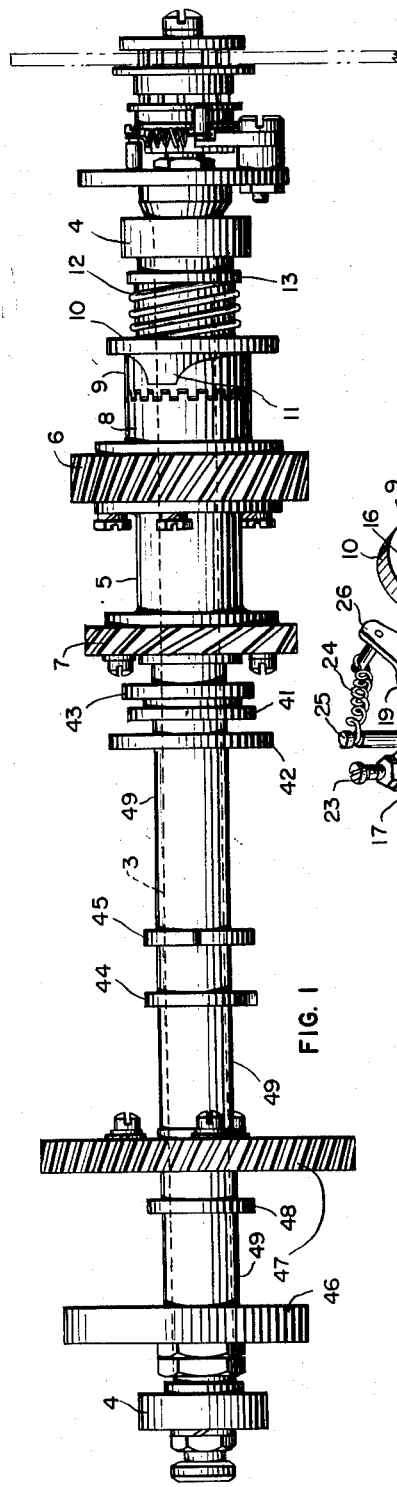
Fig. 1 is a top plan view of the shaft.

The present invention is designed to transmit power to effect a plurality of operations in timed sequence in a cycle, each cycle being executed by an individual revolution of the shaft. For example, in an electric coding machine it will operate the printing device, reset the printer for the next operation, change the coding circuits, operate the feeding of the tape upon which a message is recorded, and actuate a counter to indicate the number of characters recorded.

The shaft 3 is rotatably mounted in anti-friction bearings in the brackets 4 and has rotatably mounted on it a hub 5. Fixed to one end of hub 5 is a gear 6 that constitutes a driving connection to a motor, and to the other end of the hub is attached a gear 7 for a purpose subsequently set forth. Secured to gear 6 is a clutch driving member 8 that is engageable with clutch driven member 9 that is splined on shaft 3 to be slidable but not rotatable thereon. Flange 10 on driven member 9 has on its periphery a cam contour and it also has a lateral cam 11 formed on the side thereof proximal to clutch driving member 8. A spring 12, under compression between flange 10 and collar 13, tends constantly to urge driven member 9 into engagement with driving member 8.

Figure 2:
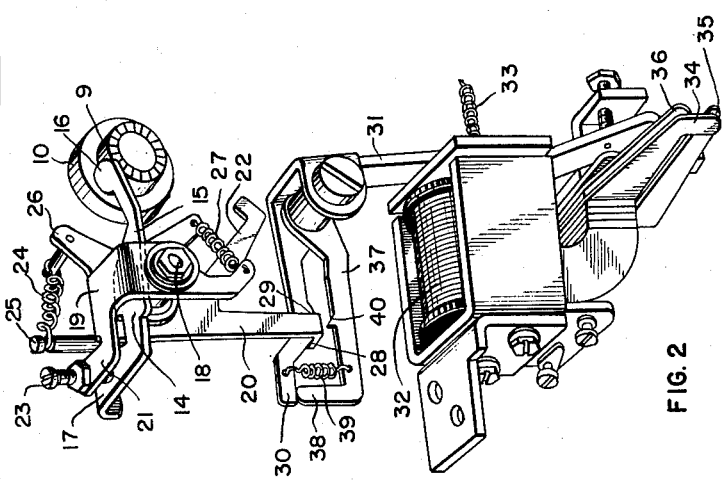
Fig. 2 is an elevational perspective view of the means for controlling the rotation thereof.

Disposed behind the shaft assembly as seen in Fig. 1 is the control device shown in Fig. 2. The clutch throw-out lever 14 has an arm 15 with a laterally turned end 16 disposed to ride on lateral cam 11 to disengage driven member 9 from driving member 8, and an operating arm 17 for a purpose hereinafter set forth. The throw-out lever 14 is rockably mounted on pivot 18 by means of spaced apart ears to impart the necessary lateral rigidity to effect disengagement of driven member 9. Also mounted on pivot 18 astride the throw-out lever 14 is a generally U-shaped stop lever 19 having a latching arm 20, an actuating arm 21 and a reset arm 22. Actuating arm 21 has threaded in it a screw 23 disposed to bear upon operating arm 17 of throw-out lever 14 so that the throw-out lever is rocked counterclockwise to release the end portion 16 from engagement with cam 11 when stop lever 19 is rocked by spring 24 which is connected, under tension between a fixed pin 25 and ear 26 on stop lever 19. Screw 23 is adjustable to regulate the degree of movement imparted to the throw-out lever. Stop lever 19 and throw-out lever 14 are connected by spring 27 under tension to hold screw 23 in yielding contact with operating arm 17.

Stop lever 19 is held against rocking during the time that clutch driven member 9 is to be kept inoperative by engagement of overturned end portion 28 on latching arm 20 with shoulder 29 on latching extension 30 of pivotally mounted armature lever 31 that is disposed to be attracted by clutch trip electromagnet 32 when the magnet is energized, but that is at other times drawn away from magnet 32 by spring 33. Contact members 34 and 35 are in contact while magnet 32 is not energized to carry current from the former to the latter to energize the magnet when an operating key is manipulated, but as soon as armature lever 31 is drawn toward magnet 32 the free end of armature lever 31 pushes contact element 36 over to separate members 34 and 35 and close a holding circuit through element 36 and element 34 to keep magnet 32 energized until the key is released.

When armature lever 31 is rocked by being attracted to magnet 32, overturned portion 28 of latching arm 20 is released from shoulder 29 and spring 24 rocks locking lever 19 counter-clockwise, causing screw 23 to bear upon operating arm 17 which lifts throw-out lever arm 15 out of engagement with cam 11 and permits driven member 9 to be engaged with driving member 8 to rotate shaft 3.

Before shaft 3 has rotated sufficiently to bring cam 11 back into position to engage the end of follower arm 15 of throw-out lever 14 the reset arm 22 of rocking lever 19 is moved by the cam on the periphery of flange 10 to rock locking lever 19 clockwise which, through spring 27, draws down follower arm 15 into position to engage cam 11 and thus to disengage driven member 9. When locking lever 19 is rotated clockwise the latching arm 20 is swung back into latching position, but since latching extension 30 is still held up by the armature lever 31 being held over by magnet 32, the shoulder 29 cannot engage the portion 28 of latching arm 20 and the clutch could again engage and rotate shaft 3. To prevent this repeat rotation of the shaft the non-repeat latch 37, pivoted at one end on the same pivot as armature lever 31, is provided. Non-repeat latch 37 has a laterally extending free end 38 to touch latching extension 30 to maintain the proper minimum spacing between the two, and is connected to latching extension 30 by a spring 39 to cause latch 37 to follow the extension 30 when the armature lever 31 is rotated by magnet 32. When clutch stop lever 19 is rocked by the peripheral cam on flange 10, the overturned portion 28 of latching arm 20 rides up over shoulder 40 on latch 37 by stretching the spring 39, and the latch 37 is immediately drawn back by spring 39 so that the overturned portion 28 of latching arm 20 engages shoulder 40 to prevent spring 24 from releasing follower arm 15 from cam 11.

When spring 33 draws armature lever 31 away from magnet 32 after de-energizing of magnet 32, the latching extension 30 pushes non-repeat latch 37 down and releases latching arm 20 from shoulder 40, but inasmuch as this shoulder is somewhat nearer the end of the latch than is shoulder 29 on latching extension 30, the latter shoulder is moved down in time to lock the latching arm 20 and so keeps the clutch driven member 9 separated from driving member 8 until subsequent operation of a key that again closes the circuit to energize magnet 32.

While not directly concerned with the present invention, the functions of the various cams and gears carried by shaft 3 will be stated to give a more thorough comprehension of one application of this invention. When this invention is utilized in an electric coding machine, the paper tape upon which the message is recorded is fed by mechanism driven through gear 7 under control of cam 41. The recording of a character is effected by a member actuated by cam 42 and the counter that registers the number of characters recorded is operated by cam 43. Establishment of a circuit to operate the printing mechanism is effected by cam 44 and the changing of the cryptographic elements is controlled by cam 45, the actual mechanical movement of the cryptographic elements being achieved by means of a device controlled by cam 46. The cam 44 in controlling the printing circuit controls also a timing contact (not shown) which is normally closed when the cam is in stop position, but is adapted to open when the cam 44 is rotated a few degrees, so that when a key lever is depressed, a circuit is completed through said timing contact and through contacts 34 and 35 (of make-before-break contracts 34, 35 and 36), then through the winding of clutch magnet 32 to ground. Since the free end of armature lever 31 pushes contact element 36 over to separate members 34 and 35 (as previously explained) and since the timing contact is opened after cam 44 has rotated only a few degrees, the contact 36 of the make-before-break arrangement functions to complete a holding circuit for magnet 32 through a universal contact (not shown) and contacts 34 and 36, so that even though said timing contact is open, the magnet 32 will remain energized so long as the key lever, which keeps the universal contact closed when depressed, is held depressed and will prevent a subsequent release of the clutch by operation of another key before a revolution of shaft 3 has been completed. This is desirable for other operations in the coding machine which are not a part of this invention. The changing of the characters printed is effected by mechanism driven by gear 47 and the setting of a printing mechanism for a subsequent character is controlled by cam 48. The several cams and gears next above described are in driving engagement with shaft 3, and are held exactly spaced and accurately in the proper rotational planes by spacers 49.

I claim:

1. A cyclically operable power transmitting device, comprising a shaft, a sleeve rotatable thereon, a driving gear and a clutch driving member fixed on said sleeve, a clutch driven member feathered on said shaft to be movable into and out of engagement with said driving member, resilient means disposed to urge said driven member toward said driving member, a radially extending flange on said driven member, said flange having formed thereon a peripheral cam and a lateral cam, a pivotally mounted throwout lever having an operating arm and a follower arm with a laterally extending portion disposed to follow said lateral cam to disengage said driven member from said driving member and lock said driven member in disengaged position; a generally U-shaped stop lever mounted on the same pivot with said throwout lever and astride the latter, said stop lever having an actuating arm, a reset arm and a latching arm, said actuating arm overlying said operating arm to apply force to said operating arm to disengage the throwout lever from said lateral cam when the stop lever is rocked in one direction, a spring connected to said stop lever to urge it in said one direction, resilient means connecting said stop lever and said throwout lever to hold said actuating arm and said operating arm in contact, said reset arm being disposed to follow said peripheral cam to re-engage said throwout lever with said lateral cam upon completion of one revolution; a pivotally mounted armature having a latching extension substantially at right angles to said armature, said extension having a shoulder engageable with said latching arm to hold said throw-out lever engaged with said lateral cam; an electromagnet disposed to attract said armature and release said latching arm from said shoulder to free said stop lever for movement on its pivot to disengage the throwout lever from the lateral cam and allow the driven member of the clutch to engage the driving member, make-before-break contacts disposed to be closed when said armature is attracted to keep said electromagnet energized for a time, a non-repeat latch co-pivotal at one end with said latching extension disposed under said extension and having a shoulder opposite the shoulder on said extension and an overturned end portion to contact said extension to limit approach of said latch theretoward, a spring connected to draw said latch and said extension toward each other, said latching arm being moved to engage the shoulder on said latch by the reset arm following said peripheral cam, said latching arm remaining so engaged while the armature is held by said electromagnet, but slipping into engagement with the shoulder on the latching extension when said stop lever turns on its pivot upon deenergization of said magnet.

2. A cyclically operable power transmitting device, comprising a shaft, a sleeve rotatable thereon, a driving gear and a clutch driving member fixed on said sleeve, a clutch driven member feathered on said shaft to be movable into and out of engagement with said driving member, resilient means disposed to urge said driven member toward said driving member, a radially extending flange on said driven member, said flange having formed thereon a peripheral cam and a lateral cam; a pivotally mounted throwout lever having a follower portion disposed to follow said lateral cam to disengage said driven member from said driving member upon completion of one revolution and lock said driven member in disengaged position; a pivotally mounted stop lever having a portion disposed to actuate said throwout lever to disengage the latter from said lateral cam, a latching portion, and a reset portion; a spring connected to said stop lever to rock the same when it is free to move thereby to disengage said throwout lever, latching means to engage said latching portion to hold said stop lever against movement by said spring, said reset portion being disposed to follow said peripheral cam to move said stop lever back to latching position, an electromagnet disposed to release said latching means when said magnet is energized, make-before-break contacts disposed to be closed when said magnet is energized to keep said magnet energized for a time, and other means to hold said latching portion in latching position during the part of a cycle that said magnet remains energized after operation of said peripheral cam, and to release said latching portion for engagement with the first mentioned latching means after said magnet is deenergized.

3. A cyclically operable power transmitting device, comprising a shaft, a sleeve rotatable thereon, a driving gear and a clutch driving member fixed on said sleeve, a clutch driven member feathered on said shaft to be movable into and out of engagement with said driving member, resilient means disposed to urge said driven member toward said driving member, a radially extending flange on said driven member, said flange having formed thereon a peripheral cam and a lateral cam; a pivoted follower disposed to ride on said lateral cam to disengage said driven member from said driving member and lock said driven member in disengaged position, spring actuated means to rock said follower on its pivot to disengage the follower from the cam, latching means to restrain operation of said spring actuated means, an electromagnet disposed to release said latching means when energized to permit disengagement of said follower from said lateral cam, an arm on said latching means positioned to follow said peripheral cam to move said latching means back to latching position after release thereof, make-before-break contact means operable to maintain said magnet energized for a time, and non-repeat means to retain said latching means in latching position while said magnet remains energized after the latching means has been moved back to latching position, said non-repeat means becoming inoperative upon deenergization of said magnet.

4. A cyclically operable power transmitting device, comprising a shaft, a sleeve rotatable thereon, a driving gear and a clutch driving member fixed on said sleeve, a clutch driven member feathered on said shaft to be movable into and out of engagement with said driving member, resilient means disposed to urge said driven member toward said driving member, a radially extending flange on said driven member, said flange having formed thereon a peripheral cam and a lateral cam; a pivoted follower disposed to ride on said lateral cam to disengage said driven member from said driving member and lock said driven member in disengaged position, spring actuated means to rock said follower on its pivot to disengage the follower from the cam, latching means to restrain operation of said spring actuated means, an electromagnet disposed to release said latching means when energized to permit disengagement of said follower from said lateral cam, an arm on said latching means positioned to follow said peripheral cam to move said latching means back to latching position after release thereof, and means to prevent a second disengagement of said follower from said lateral cam during any one period of energization of said electromagnet.

5. A cyclically operable power transmitting device, comprising a shaft, mounted on said shaft a clutch including a driving member rotatable on said shaft but not slidable thereon and a driven member slidable on said shaft but not rotatable thereon, means operative when unrestrained to engage said driven member with said driving member, an axially extending cam on said driven member, a pivoted lever having an end disposed to follow said cam to disengage said driven member from said driving member and lock said driven member in disengaged position; means to control the engagement of said lever with and its disengagement from said driving member including a rockably mounted element having a portion positioned to contact said lever to disengage said lever from said cam, a latching portion and a reset portion; a latch disposed to engage said latching portion to lock said lever in engagement with said cam, an electromagnet adjacent said latch to move said latch out of engagement with said latching portion when energized, a second cam on said driven member contactible with said reset portion to move said latching portion back into position to be engaged by said latch, and means to prevent a second release of said lever during any one period of energization of said electromagnet.

6. A cyclically operable power transmitting device, comprising a shaft, mounted on said shaft a clutch including a driving member rotatable on said shaft but not slidable thereon and a driven member slidable but not rotatable thereon, resilient means surrounding said shaft and operative when unrestrained to engage said driven member with said driving member, an axially extending cam on said driven member, means to disengage said driven member from said driving member at the end of a cycle of operation by engagement with said axially extending cam, U-shaped means operatively connected to said disengaging means for holding said disengaging means out of contact with said axially extending cam, electromagnetically operated means including a latching extension for latching said U-shaped member in position to hold said disengaging means into contact with said axially extending cam when said electromagnet operated means is in inoperative position, but releasing said U-shaped member and said disengaging means from said axially extending cam when said electromagnet operated means is in operative position, a radially extending cam on said driven member for returning said U-shaped member to its first position and catch means operatively connected to said electromagnetically operated means and said latching extension to hold said U-shaped member in a position to prevent a second release of said disengaging means from said axially extending cam during any one cycle of operation.

References Cited in the file of this patent

UNITED STATES PATENTS

| | | |
|---|---|---|
| 1,383,525 | Carroll | July 5, 1921 |
| 1,640,871 | Ballard | Aug. 30, 1927 |
| 2,019,505 | Reicher | Nov. 5, 1935 |
| 2,049,690 | Cunningham | Aug. 4, 1936 |
| 2,224,192 | Madsen | Dec. 10, 1940 |
| 2,271,359 | Zeruneith | Jan. 27, 1942 |